US012380145B2

(12) United States Patent
Cho et al.

(10) Patent No.: US 12,380,145 B2
(45) Date of Patent: Aug. 5, 2025

(54) METHODS, MEDIUMS, AND SYSTEMS FOR REUSABLE INTELLIGENT SEARCH WORKFLOWS

(71) Applicant: CAPITAL ONE SERVICES, LLC, McLean, VA (US)

(72) Inventors: Paul Cho, Boston, MA (US); Gary B. Williams, Williamsburg, VA (US); Alexander Bussan, Arlington, VA (US); Eric Campbell, McLean, VA (US); Piper Alexandra Coble, Richmond, VA (US); Ralph Lozano, Brooklyn, NY (US); Mukund Manikantan, McLean, VA (US); Talyne Derderian Walsh, Rockville, MD (US); Talha Koc, Jersey City, NJ (US); Prarthana Bhattarai, Quincy, MA (US)

(73) Assignee: Capital One Services, LLC, McLean, VA (US)

( * ) Notice: Subject to any disclaimer, the term of this patent is extended or adjusted under 35 U.S.C. 154(b) by 22 days.

(21) Appl. No.: 17/710,009

(22) Filed: Mar. 31, 2022

(65) Prior Publication Data
US 2023/0315766 A1 Oct. 5, 2023

(51) Int. Cl.
*G06F 16/3332* (2025.01)
*G06F 16/332* (2025.01)
*G06F 16/338* (2019.01)

(52) U.S. Cl.
CPC ...... *G06F 16/3338* (2019.01); *G06F 16/3326* (2019.01); *G06F 16/338* (2019.01)

(58) Field of Classification Search
CPC . G06F 16/338; G06F 16/3326; G06F 16/3338
See application file for complete search history.

(56) References Cited

U.S. PATENT DOCUMENTS

2018/0293483 A1* 10/2018 Abramson .............. H04L 51/02
2019/0065576 A1* 2/2019 Peng ..................... G06F 16/285
(Continued)

OTHER PUBLICATIONS

Devlin et al., "BERT: Pre-training of Deep Bidirectional Transformers for Language Understanding" arXiv:1810.04805v2 [cs.CL] May 24, 2019.
(Continued)

*Primary Examiner* — Amanda L Willis
(74) *Attorney, Agent, or Firm* — KDW Firm PLLC (57) ABSTRACT

Exemplary embodiments provide methods, mediums, and systems for performing a reusable, intelligent semantic search across a potentially large number of records. Embodiments may be particularly useful for responding to requests for information from regulatory agencies. In one embodiment, an embedding model is trained to embed queries in an embedding space. When a new query is received, the new query is embedded with the embedding model. A set of documents (e.g., previous responses to regulatory inquiries) may be searched using the embedded query and an indexing model that allows for efficient searches of embedding spaces. A number of results may be returned from the document store, and the results may be ranked by a ranking model. User feedback about the quality of the results may be received, and the ranking model may be retrained based on the feedback.

20 Claims, 5 Drawing Sheets

(56) References Cited

U.S. PATENT DOCUMENTS

| | | | |
|---|---|---|---|
| 2020/0250537 A1* | 8/2020 | Li | G06F 18/2148 |
| 2022/0019671 A1* | 1/2022 | Boone | G06F 11/3438 |
| 2022/0138433 A1* | 5/2022 | Divakaran | G06N 3/08 |
| | | | 704/9 |

OTHER PUBLICATIONS

Conneau et al. "Supervised Learning of Universal Sentence Representations from Natural Language Inference Data" arXiv:1705.02364v5 [cs.CL] Jul. 8, 2018.

Jegou et al., "Faiss: A library for efficient similarity search" Engineering at Meta—Mar. 29, 2017.

Author Unknown, "Welcome to Elastic Docs" Elastic—retrieved Jul. 27, 2022—URL: https://www.elastic.co/guide/index.html.

* cited by examiner

METHODS, MEDIUMS, AND SYSTEMS FOR REUSABLE INTELLIGENT SEARCH WORKFLOWS

BACKGROUND

Individuals or organizations may store large amounts of information that may need to be quickly searched. For instance, regulated entities (such as financial or pharmaceutical companies) may be sent an inquiry from a regulator, and may have only a limited amount of time to reply. Finding the information that is responsive to that inquiry can be a difficult and time consuming task.

Some of the information used to respond to the inquiry may be distributed in one or more databases, on backup records, etc. In addition to stored information, the person or people who are tasked with responding to the question may have some institutional knowledge about how similar questions were answered in the past, or where to find data relevant to the query. Conventionally, a question might be routed to a person within the organization who has historically been responsible for handling similar queries, and this person might search through the company's records to supplement their own understanding.

As people leave the organization (or move within it), some of the institutional knowledge about how to respond to these queries may be lost. Furthermore, because some information may not be readily accessible (or not accessible in the limited amount of time available), it is possible that the responder may inadvertently provide incomplete or even inaccurate information.

Further complicating matters, a simple keyword search of the company's records may not yield the desired results. For example, a regulator might ask a question such as "describe your network vulnerability mitigation policies" in one year, and then might ask for a description of "cybersecurity standards" the next. Although the information submitted in response to the former question might be highly relevant to the latter one, a keyword search for "cybersecurity standards" might not turn up the earlier question and responses. A search that is sensitive to the semantics of a query may be much more helpful to identify relevant information.

BRIEF SUMMARY

Exemplary embodiments relate to computer-implemented methods, as well as non-transitory computer-readable mediums storing instructions for performing the methods, apparatuses configured to perform the methods, etc.

According to a first embodiment, a natural language search query pertaining to a request for information may be received. The natural language search query might correspond to, for example, an inquiry or examination sent by a regulatory agency. The natural language search query may be searched in a database or other form of data storage. To that end, a set of documents may be accessed, where each document includes a document query and a document response. The document queries may represent, for instance, previous queries from regulatory entities, while the document response includes information pertinent to those queries, such as the response sent to the regulatory agency, explanatory or contextual notes, the identities of parties responsible for handling the response, etc.

Each document query from the set of documents may be embedded in an embedding space according to an embedding model. The embedding space may represent a mapping of the semantics of the document query to the embedding space, where semantically similar queries are mapped to similar locations in the embedding space. One example of an embedding model suitable for use with exemplary embodiments is a deep-learning based Sentence Bidirectional Encoder Representations from Transformers (S-BERT) model.

An embedding of the search query may be created using the embedding model. The embedding of the search query may be used to perform a semantic search on the embedding space to identify document queries that are semantically similar to the search query. At least one of the documents may be returned as a search result based on a proximity of the document query from the returned document to the search query in the embedding space.

By recording responses to previous inquiries as query/response pairs in the set of documents, previous responses to questions can be stored for quick access in the future. An entity may use the information submitted in previous responses as a starting point for a new response, potentially supplemented or updated with current information. This may allow such entities to respond faster, with more complete and accurate information than might otherwise be possible.

Because the document query and the search query are embedded in an embedding space according to an embedding model, semantically similar document queries can be identified without performing inexact keyword matching. This allows a greater breadth of more relevant information to be obtained.

Furthermore, because the system is model-based, different data sets can be swapped in without the need to perform retraining. Thus, the system becomes reusable across a wide variety of different data sets.

According to a second embodiment that may be used with any combination of the other embodiments, the request for information may be a request from a regulatory entity, and the set of documents may include previous responses to regulatory queries. Exemplary embodiments are particularly well-suited to archiving and searching for regulatory information, because such queries can be highly sensitive to context and semantics. Moreover, regulatory agencies often provide a limited amount of time to respond with detailed, up-to-date information. A reusable, semantic search like the one described herein can provide accurate and detailed responses for regulatory agencies where conventional methods would be limited by technological and human factors.

According to a third embodiment that may be used with any combination of the other embodiments, a plurality of documents may be returned as search results. The plurality of documents may be ranked based on the respective proximities of their respective document queries to the search query in the embedding space. The document queries from the plurality of documents may be submitted to a reranking model configured to rerank the document queries based on prior user feedback. The plurality of documents may be re-ranked based on the reranking model.

By adding a reranking model to the above-described embodiments, the system can be configured to respond to user feedback and thus improve its search results over time. For example, according to a fourth embodiment that may be used with any combination of the other embodiments, user feedback may be received for a selected search result, and the reranking model may be retrained based on the received user feedback.

According to a fifth embodiment that may be used with any combination of the other embodiments, the embedding model may be trained with labeled data, and an indexing model configured to perform the semantic search on the embedding space may also be trained. By using embedding and indexing models, the semantic search can become reusable—instead of providing a new system for each document set, different document sets can be provided to the embedding and indexing models. Moreover, by use of an indexing model, the system can be configured to search through very large document stores (even including million-to-billion scale datasets) more efficiently than might be possible with conventional search techniques such as a SQL query. One example of a suitable indexing model is the Facebook Artificial Intelligence Similarity Search (FAISS) provided by Meta Platforms Inc. of Menlo Park, California.

According to a sixth embodiment that may be used with any combination of the other embodiments, the set of documents may be a first set of documents and the semantic search may be a first semantic search. The first set of documents may be swapped for a second set of documents different from the first set of documents, and the indexing model may be applied to perform a second semantic search based on a new natural language search query. The sixth embodiment further demonstrates the reusability of the system's workflows (including, e.g., the use of the indexing model and embedding model) when deployed in new contexts.

According to a seventh embodiment that may be used with any combination of the other embodiments, the proximity of the document query from the returned document to the search query in the embedding space may be represented as a cosine similarity. The use of cosine similarity provides a relatively fast and accurate way to measure the semantic difference between two different embeddings in the embedding space.

Other technical features may be readily apparent to one skilled in the art from the following figures, descriptions, and claims. Unless otherwise noted, it is contemplated that each of the described embodiments may be used separately to achieve the advantages noted, or in any combination in order to achieve further synergistic effects.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Many businesses receive many requests from regulatory agencies every year—for instance, some departments may receive more than 1,000 such requests per year. Currently, the process for responding to these requests generally requires an individual within the organization to generate a response, often relying on their own knowledge and supplemented with organization data that encompasses the time period being asked about.

If the regulatory agency submitted a similar request in the past, then the previous request can be helpful in responding to the current request. The previous response might serve as a template for the current response, and if the previous and current requests asked similar questions or asked about overlapping time periods, the information in the previous request might be used to respond to the current request. However, these previous responses are only helpful if they can be quickly found and retrieved. This process can be complicated by the fact that requests might not be phrased the same way every time, so a simple keyword search on the text of the request may not turn up previous requests with similar (but not identical) wording.

Furthermore, because it can be so difficult to find similar or related requests, some opportunities can be lost. For instance, it would be helpful to identify all the requests that were received on a particular topic so that the organization can identify trends or the historical background that led to the current request. This may help the organization to anticipate future requests and prepare the appropriate documents before the request is received, or to identify the reasons that the request was made so that the organization can respond with more pertinent information.

Exemplary embodiments provide reusable and customizable workflows configured to enable semantic search across records, such as records of previous regulatory examinations, which may allow users to understand intent and ensure consistent responses.

Although some embodiments are described in terms of responding to regulatory requests, the technology described below can be useful in numerous contexts (e.g., audit requests, etc.). In general, any situation in which a store of documents or records needs to be searched based on semantic content is a good candidate for use with the techniques described herein.

Exemplary embodiments may make use of several models to efficiently and intelligently search a document store. For instance, an embedding model is used to transform a natural language input into a vector in an embedding space. An indexing model may be used to index a document store and allow for a fast, efficient search among thousands to millions of documents, based on the embeddings provided by the embedding model. Based on the indexing model, the document store may be searched and a top n number of results may be returned (where n is an integer greater than zero). The n results may be ranked according to how closely related they are to the search query based on a ranking model. The ranking model may be retrained based on feedback received from users (e.g., in a web interface where a user can indicate whether an answer is helpful or not helpful).

Exemplary embodiments may make use of up to three workflows. A first workflow may be used to train the models (e.g., learning the embeddings in the embedding model, clustering the document store for efficient search in the indexing model, and learning to rank the results in the ranking model). A second workflow may perform inference: when a new query is received, it may be run through the inference workflow that: a) embeds the text of the new query according to the embedding model; b) queries the trained index for top n semantically similar sentences; and c) ranks the top n results based on the reranking model. A third workflow allows the ranking model to be retrained on the fly.

As users provide feedback regarding whether a result was helpful or not, the first workflow may be retriggered with the feedback (e.g., to retrain the ranking model so that the embeddings more closely approach the desired results as indicated by the feedback). This triggering may specify the need to only retrain the ranking model.

One advantage of using these workflows is that the intelligent search becomes reusable and extensible. For instance, one could swap out the data sources and reuse the same workflows for a new search use case, without the need to set up anything (e.g., new models) on their own.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

Figure 1:
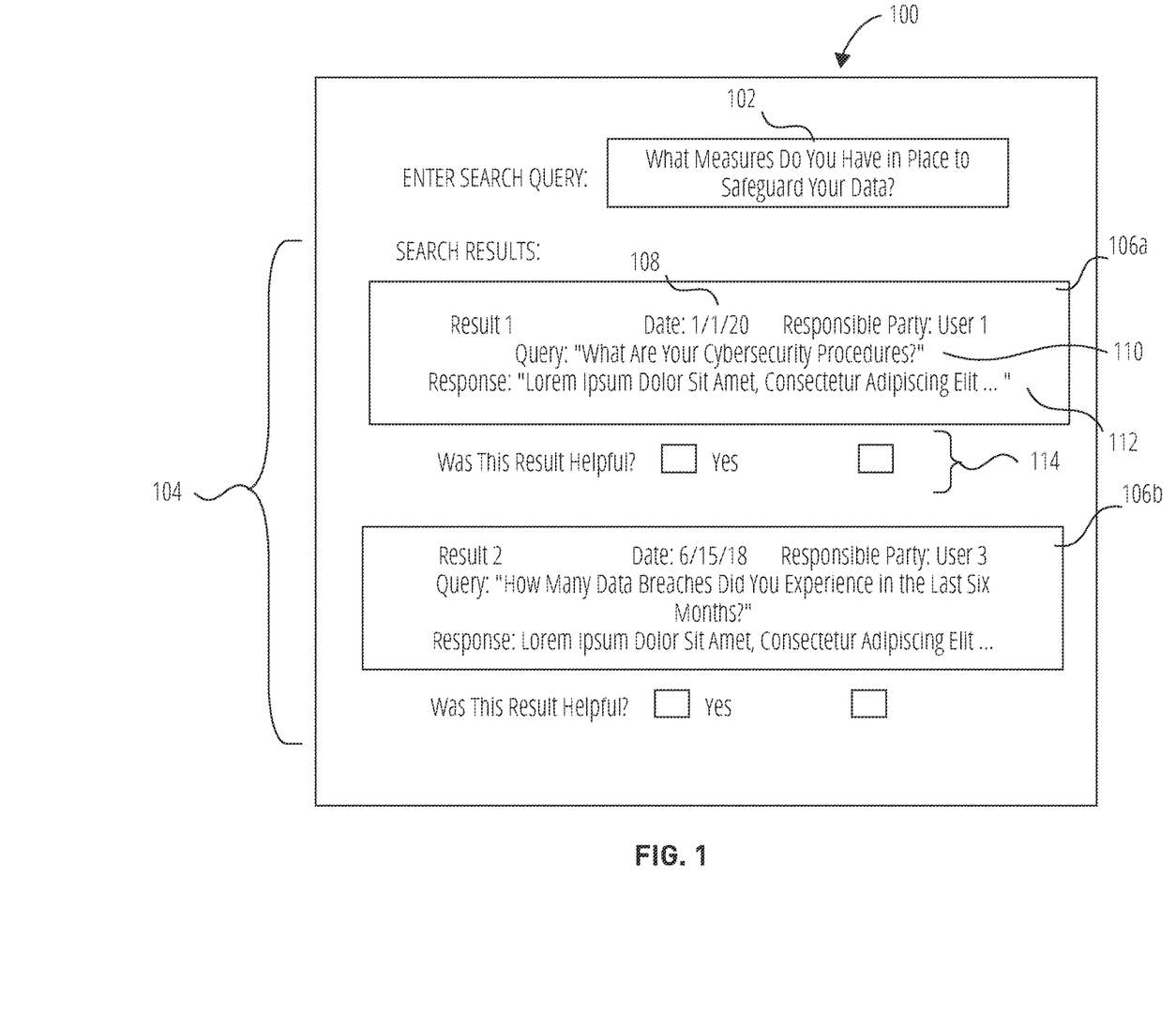
FIG. 1 illustrates an exemplary user interface in accordance with one embodiment.

FIG. 1 depicts an exemplary graphical user interface 100 configured to receive, as input, a user search query and display, as output, ranked search results based on a semantic search of a document store. The interface 100 may be displayed in any suitable manner—for example, the interface 100 may be a web page viewed through a web browser, an application interface on a user device, etc.

The interface 100 may include an interactable element configured to receive a natural language search query 102, which may be input text that corresponds to a request for information (such as a request for information from a regulatory agency). The natural language search query 102 may be entered into a text box or input in any other suitable way. For example, the natural language search query 102 may be automatically retrieved from a received query, such as from an email, form, scanned letter, etc.

A search may be performed on the natural language search query 102 to generate search results 104 that are displayed in the interface 100 in a ranked order. The search results 104 may include a number of results 106a, 106b, . . . . A number n of such results may be displayed (where n is an integer greater than 0, such as 10).

Each result 106a may include result metadata 108, such as a date associated with the result (which may be the date that the result was submitted to a regulatory agency, the date the result was generated, the date the query that led to the result was received, etc.). The result metadata 108 may further include an identifier for an individual that generated or signed off on the result.

The result 106a may further include a document query 110 and a document result 112. Each of the results 106a may be stored in a document or other data structure, and may be indexed by the document query 110. The document query 110 may represent the question that prompted the organization or individual to generate a response. The document result 112 may include the response that the organization or individual generated in reply to the document query 110.

Each result shown on the interface 100 may be associated with result feedback 114. The result feedback 114 may include one or more interactable elements that allows a user to indicate whether a result was helpful or not. The result feedback 114 may optionally include a scale (e.g., "very helpful, somewhat helpful, not very helpful, not helpful at all"). The feedback obtained from the result feedback 114 may be used to retrain a ranking model, as described below.

Figure 2:
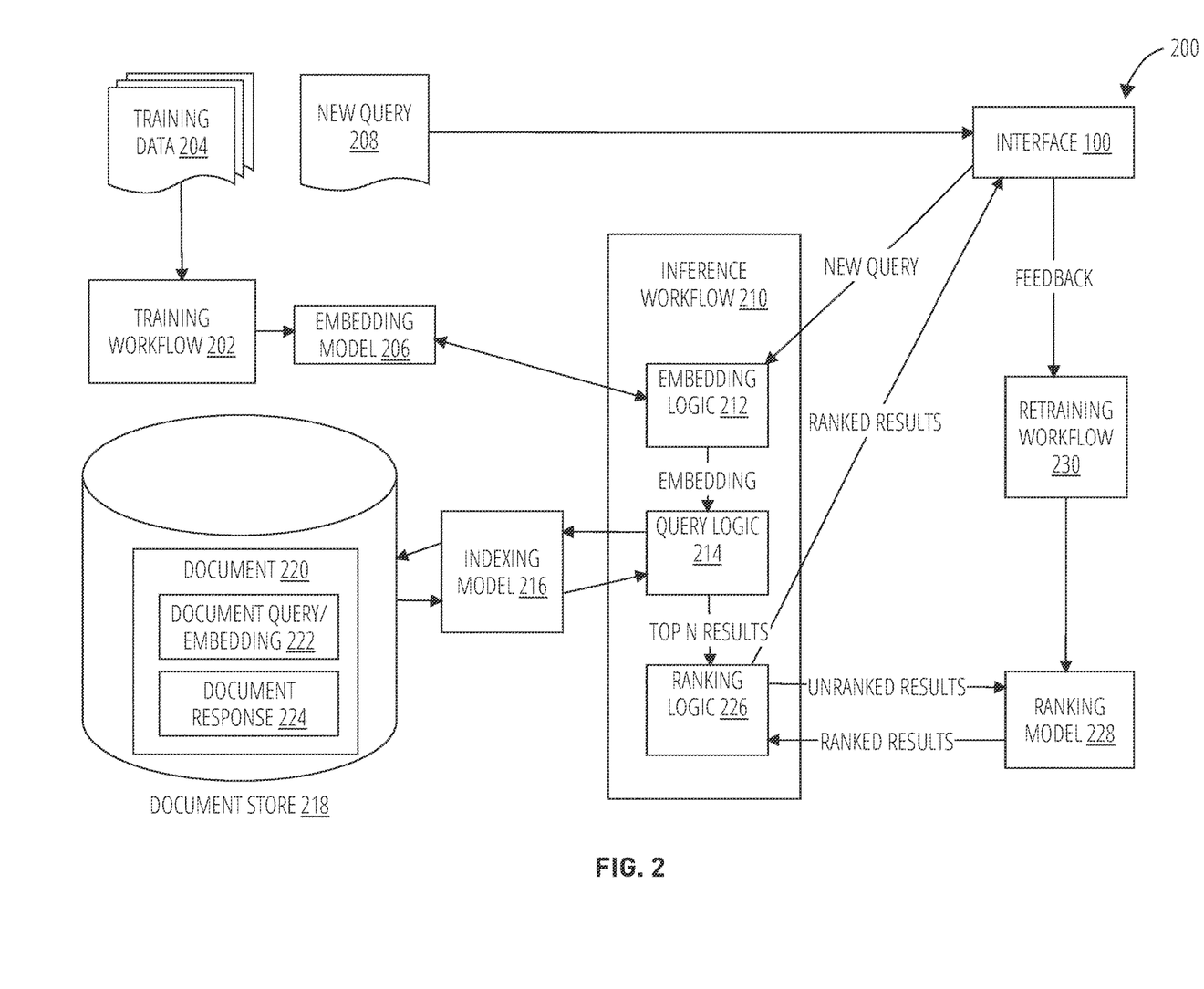
FIG. 2 illustrates an exemplary intelligent search system in accordance with one embodiment.

FIG. 2 depicts an exemplary system 200 suitable for performing an intelligent and reusable semantics-based search.

The system 200 may include or may access a document store 218. The document store 218 may include previously generated responses to queries, such as responses to regulatory queries. The document store 218 may store one or more documents 220 (although other suitable data structures may also be used), where each document includes a document query/embedding 222. The document query/embedding 222 may include the natural language query (e.g., sent from the regulatory entity). The document query/embedding 222 may include the original natural language query and/or an embedding of the query in an embedding space as generated by an embedding model 206. Each document 220 may further store a document response 224, which may represent the natural language reply that was submitted in response to the document query/embedding 222. Each document 220 may include further information, such as the examiner at the regulatory agency that asked the question, or other metadata as noted above.

The system 200 may be configured to provide a training workflow 202 used to train an embedding model 206. The training workflow 202 may be stored as logic on a non-transitory computer-readable medium, while the embedding model 206 may be stored as a data structure on the same or a different non-transitory computer-readable medium. The embedding model 206 may be configured to accept natural language inputs and represent them as vectors in an embedding space. Different vectors in the embedding space may have similar magnitudes and/or directions depending on how semantically similar the natural language inputs that gave rise to the vectors are. One example of an embedding model 206 suitable for use with exemplary embodiments is a Sentence Bidirectional Encoder Representations from Transformers (S-BERT) model, although other types of embedding models 206 (such as the Universal Sentence Encoder or the InferSent encoder provided by Meta Platforms, Inc. of Menlo Park, California) may also be used.

The training workflow 202 may accept training data and use the training data to train the embedding model 206. The training data may include natural language sentence pairs as well as a label (e.g., "similar"/"not similar") or score (e.g., a value from 1-10) indicating whether the sentences in the pair are similar (or, in the case of a score, how similar they are). Based on the similarity labels/scores, the training workflow 202 may train the embedding model 206 to recognize semantic similarities and configure the embedding model 206 to transform a natural language input into a vector or other suitable structure that may be mapped to an embedding space.

When a new query 208 is received (e.g., from a regulatory entity), it may be entered into an interface 100 (such as the interface 100 depicted in FIG. 1). The interface 100 may be configured to provide the new query 208 to an inference workflow 210 that is configured to perform a semantic search on the new query 208 and return the semantically closest results from a document store 218.

To that end, the inference workflow 210 may apply embedding logic 212 that is configured to apply the embedding model 206 to the new query 208. The embedding logic 212 may thus generate a vector or similar construct from the new query 208 that can be mapped to the embedding space.

This embedding may be provided to query logic 214 configured to query the document store 218. The query logic 214 may query the document store 218 with the assistance of an indexing model 216. The indexing model 216 may be configured to access the document store 218 and build an index of the document query/embeddings 222 from the document store to allow for more efficient or faster searches. The index may be built using the embedding model 206. For example, the indexing model 216 may cluster the document query/embedding 222 from each of the documents 220 in the document store 218. These clusters may be organized into cells. In order to improve the efficiency of the search, the new query 208 that is being searched may first be mapped to the embedding space, and the resulting vector may be assigned to an appropriate cell. Then, only those vectors from the document store 218 that are present in the cell are compared to the vector for the new query 208. This allows the search to be sped up significantly because it is not necessary to compare the new vector to all the vectors from the document store.

An example of a suitable indexing model 216 is the Facebook Artificial Intelligence Similarity Search (FAISS) provided by Meta Platforms, Inc. of Menlo Park, California. One of ordinary skill in the art will recognize that other types of indexing models 216 may also be used, such as Amazon Web Services' (AWS) ElasticSearch provided by Amazon, Inc. of Seattle, Washington.

The query logic 214 may be configured to use the indexing model 216 to search the document index for document query/embeddings 222 that are semantically similar to the new query 208. For instance, the query logic 214 may compare the vectors representing the document query/embeddings 222 and the new query 208 based on a metric, such as Euclidean distance or cosine similarity. The query logic 214 may retrieve the n closest matches from the document index (where n is an integer greater than zero) and provide them to ranking logic 226. The ranking logic 226 may perform an initial ranking of the results to place them in an initially-ranked order. The initial ranking assigned to the results may be based on their semantic closeness to the new query 208 in the embedding space—for example, the results with the lowest Euclidean distance or highest of cosine similarity may be ranked the highest.

The ranking logic 226 may then re-rank the results by applying a ranking model 228. The ranking model 228 may be initialized so that it simply uses the initial ranking based on the vector similarities. For instance, the ranking model 228 may be a neural network that is trained to map the new query 208 and the result document query/embedding 222 to the similarity score that was calculated between the two (e.g., the Euclidean distance or the cosine similarity). However, over time the ranking model 228 may be modified to adjust the rankings based on user feedback received in the interface 100. When the ranked results are presented to the user in the interface 100, the interface 100 may provide the user with the opportunity to indicate whether the results are useful (and/or how useful). The feedback may be provided to a retraining workflow 230 configured to adjust the ranking model 228. For instance, if the ranking model 228 is a neural network, the weights assigned to the nodes in the network may be adjusted so that results receiving better feedback are assigned a higher rank. Optionally, this information may also be fed back into the embedding model 206 to change the way that the embedding model 206 embeds queries in the embedding space.

A user may select the results in the interface 100 to retrieve the corresponding document 220 from the document store 218. The user may use the document 220 to formulate a response to the new query 208. After the new query 208 is answered, the new query 208 and the resulting response may be added as a new document 220 in the document store 218.

One benefit of the system 200 is its modular and reusable nature. Once the models are trained, the document store 218 can be swapped for a different document store 218 to search a different knowledgebase. The models need not be retrained when this swapping is done, and so a user can search for the same query in different data sets, or can apply the same system 200 to search different queries in different data sets.

Another benefit is that the system can be used to identify semantically similar queries within the document set. For instance, as the documents 220 are clustered by the indexing model 216, the system 200 can identify clusters of similar questions and track those clusters over time. A user may then retrieve one or more of the clusters; because the clusters include semantically similar queries over a period of time, the clusters can be used to identify trends in the questions being asked by regulators.

In some embodiments, the system 200 may be configured to automatically identify trends in queries over a period of time. For instance, the system may be configured to infer, based on the cluster or clusters that new queries 208 are added to, what topics are currently of interest to regulatory examiners. In some cases, regulatory entities may publish examination handbooks that include lists of questions that may be asked by regulatory entities. By comparing the examination handbooks to the document index (and especially the most recently-asked questions from the regulatory agency that are stored in the index), the system 200 can be trained to identify which portions of the handbook are currently serving as a focus for regulatory examinations (this information may be presented to users on the interface 100 or sent as a notification, e.g., by email). In a similar manner, the system 200 can be trained to identify the areas of focus of individual examiners within the regulatory agency, based on the questions that each examiner tends to focus on.

This benefit can be further enhanced if different regulated entities (e.g., internal lines of business) are willing and/or able to share their responses to regulatory queries and build a common document store 218 that is shared between two or more internal entities. This may allow regulated entities to better anticipate industry-wide regulatory trends and begin to prepare for anticipated regulatory questions. Still further, it allows users to identify why certain questions are being asked (e.g., Line of Business X experienced a data breach and then Lines of Business Y and Z received regulatory questions about their data security practices).

The system comprises a training workflow 202, an inference workflow 210, a document store 218, a training data 204, a retraining workflow 230, an interface 100, an embedding model 206, an embedding logic 212, a query logic 214, a ranking model 228, a new query 208, a document 220, a document query/embedding 222, a document response 224, a ranking logic 226, and an indexing model 216.

Figure 3:
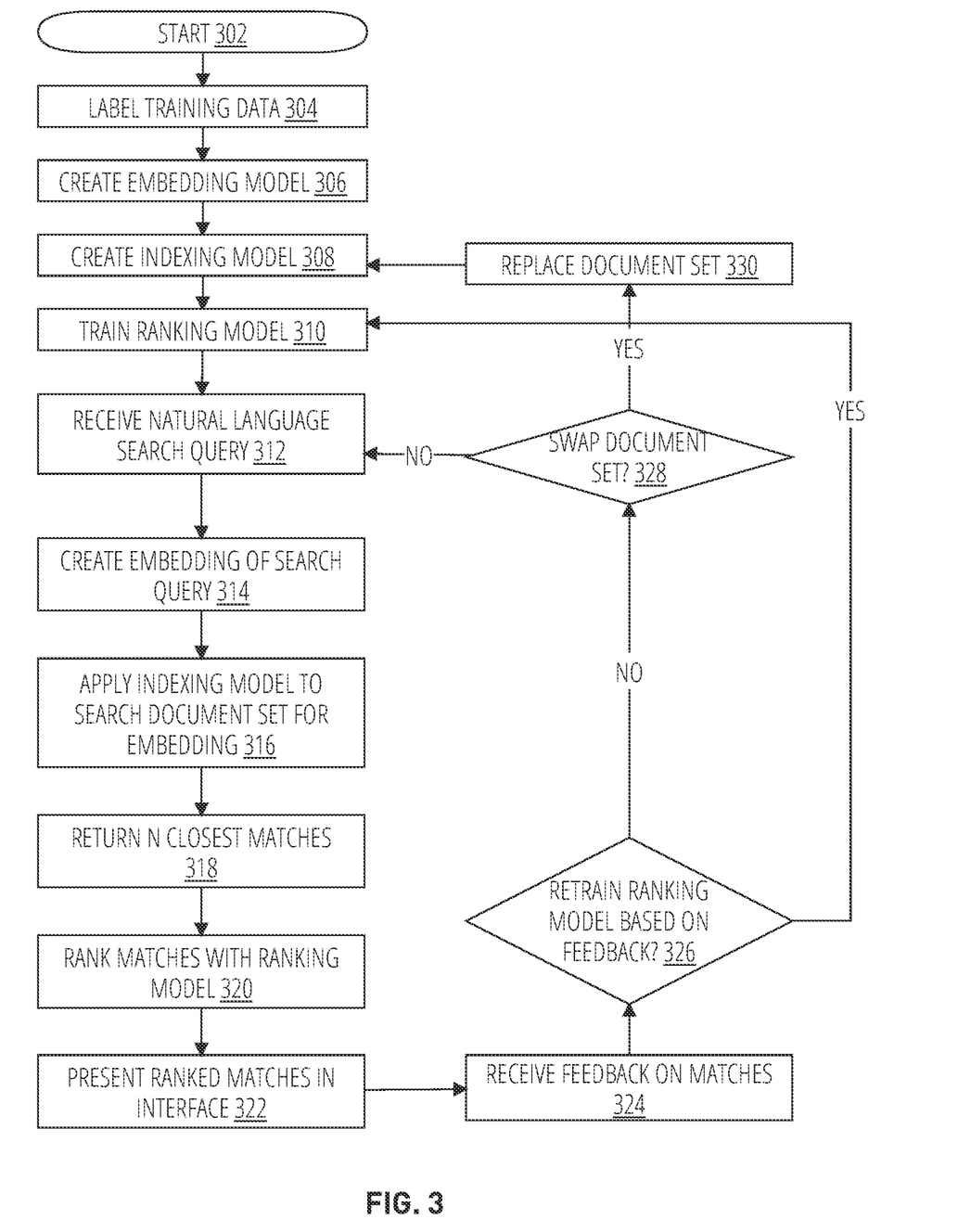
FIG. 3 is a flowchart depicting exemplary logic suitable for performing an intelligent search in accordance with one embodiment.

FIG. 3 is a flowchart depicting exemplary logic for performing a computer-implemented method according to an exemplary embodiment. The logic may be embodied as instructions stored on a computer-readable medium configured to be executed by a processor. The logic may be implemented by a suitable computing system configured to perform the actions described below.

Processing begins in start block 302. Start block 302 may be initialized, for example, when a user runs an application that encompasses one or more of the workflows of the system, or loads the interface 100.

In block 304, the system may access or may create labeled training data. For instance, the labeled training data may include sentence pairs and a measure of how semantically similar the sentence pairs are. This information may be used to create the embedding model in block 306, as described in more detail above. The training data received in block 304 may also include training data for creating the indexing model and/or the ranking model.

At block 308, an indexing model may be created. Creating the indexing model may involve accessing a document store, and training the indexing model to perform clustering or other optimizations that allow the document store to be quickly and efficiently searched. The indexing model may create a document index from the document store in order to assist in searching the document store. For instance, the indexing model may organize the vectors for the document queries from the document store into cells in the embedding space, where new queries are first mapped to a cell and then only those vectors within that cell are compared to the new query. The indexing model may optionally also apply other optimizations, such as reducing the dimensionality of the existing document queries and the new query.

In block 310, the ranking model may be trained. Initially, the ranking model may be trained to simply reflect the similarity between two vectors within the embedding space. As feedback is received, the ranking model may be retrained to adjust the weight assigned to each search result.

In block 312, a natural language search query may be received. The natural language search query may correspond, for example, to a question posed by a regulatory entity. In block 314, an embedding of the search query may be created by applying the embedding model to the search query.

In block 316, the indexing model may be applied to search the document set for embedding. For example, the embedding of the search query may be mapped to a cell within the index created by the indexing model. The other embeddings in the cell may be compared to the embedding for the search query, such as by computing a cosine similarity score (or Euclidean distance, or other measure of similarity) between each existing embedding and the new query's embedding. These measures may be used to generate a similarity score that represents how semantically close the new query is to each of the existing queries. In block 318, then closest matches (where n is a predetermined integer greater than zero and the closest matches are those matches having the highest similarity scores) may be identified and returned.

In block 320, the n closest matches may be ranked with the ranking model. The n closest matches may receive an initial ranking based on their similarity scores, and then these rankings may be adjusted using the ranking model. Alternatively, the n closest matches may be provided to the ranking model without performing an initial ranking, and the ranking model may perform the ranking. In block 322, the ranked matches may be presented in an interface.

The interface may include options for providing feedback about the matches. In block 324, the system may receive such feedback from a user. In decision block 326, the system decides whether to retrain the ranking model based on feedback. For example, if the feedback is consistent with the original ranking (e.g., the user indicated that relatively highly ranked results were helpful), then it may not be necessary to retrain the ranking model and processing may proceed to block 328. On the other hand, if the system decides to retrain the ranking model (e.g., because the user indicated that relatively highly ranked results were not helpful, or that relatively low ranked results were more helpful than relatively highly ranked results), then processing may return to block 310 and the ranking model may be retrained.

In decision block 328, the system may receive an instruction to swap the document set that is indexed by the indexing model. If the system is instructed to swap the document set, then the document set may be changed at block 330. When swapping the dataset, the workflow may revert to block 308 to recreate the indexing model (because the indexes may no longer be valid in a new dataset). This is due to the fact that the new dataset is likely to be a different set of documents, which in turn will generate new word embeddings which could invalidate the existing indexes (thus leading to retraining the subsequent ranking model).

The embedding model (block 306) may also need to be retrained in some circumstances, such as when the documents in the new document set are drastically different (otherwise, there is a likelihood that the same embedding model can be reused). Thus, an optional verification step may be applied to verify that the embeddings of the new dataset are of sufficient quality. If so, processing can proceed from block 330 to block 308 (skipping the retraining of the embedding model). If not, processing may revert to block 306 and retrain the embedding model.

If the document set is not swapped at decision block 328, processing may revert to block 312 and a new natural language search query may be received.

Although FIG. 3 depicts certain actions occurring in a specific order, it is understood that embodiments may encompass more, fewer, or different actions. The actions may be performed in a different order, and some actions may be performed in parallel.

Figure 4:
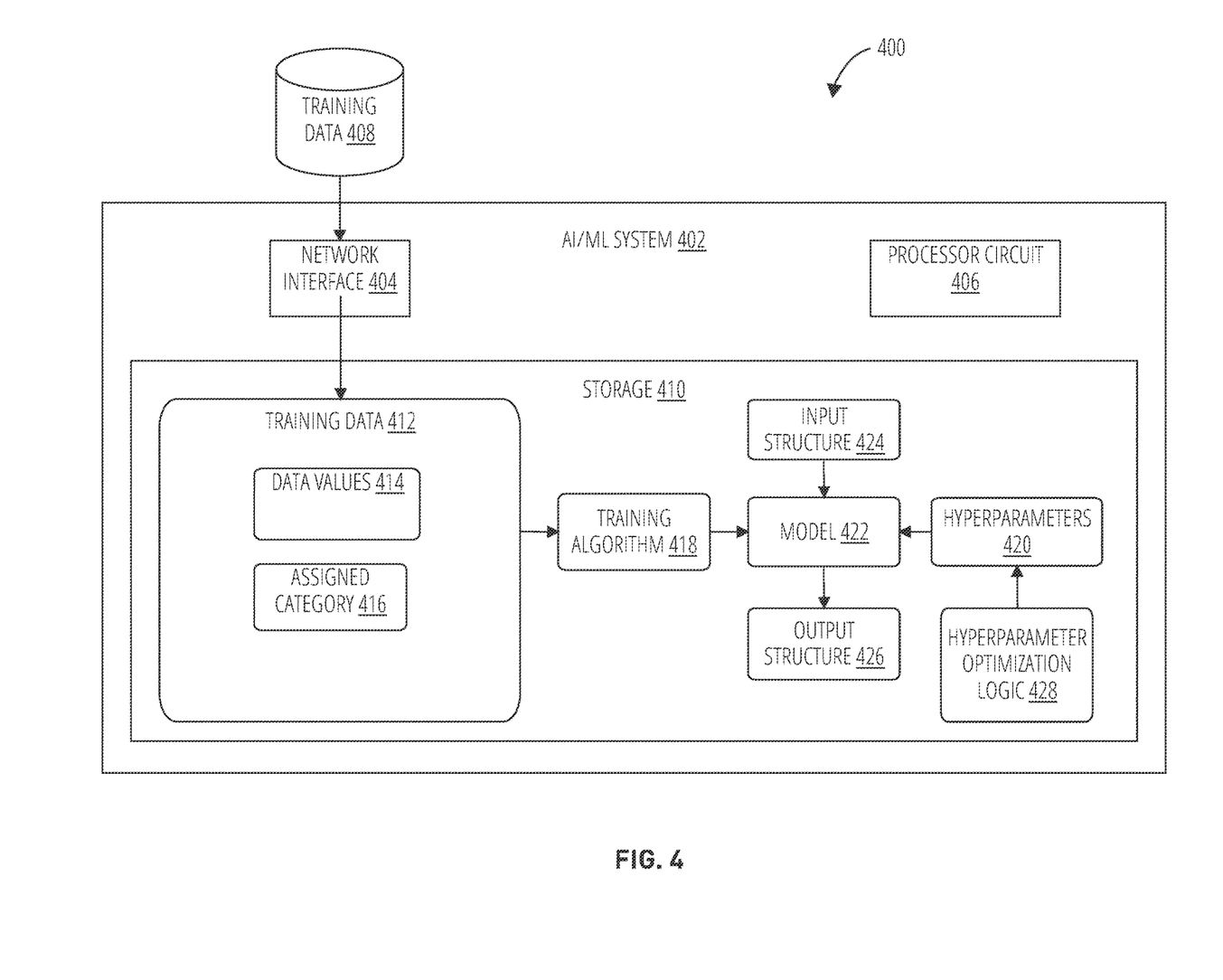
FIG. 4 illustrates an exemplary artificial intelligence/machine learning (AI/ML) system suitable for use with exemplary embodiments.

Exemplary embodiments may make use of artificial intelligence/machine learning (AI/ML). FIG. 4 depicts an AI/ML environment 400 suitable for use with exemplary embodiments.

At the outset it is noted that FIG. 4 depicts a particular AI/ML environment 400 and is discussed in connection with supervised training techniques. However, other AI/ML systems also exist, and one of ordinary skill in the art will recognize that AI/ML environments other than the one depicted may be implemented using any suitable technology.

The AI/ML environment 400 may include an AI/ML system 402, such as a computing device that applies an AI/ML algorithm to learn semantic relationships between different natural language samples.

The AI/ML system 402 may make use of training data 408. In some cases, the training data 408 may include pre-existing labeled data from databases, libraries, repositories, etc. The training data 408 may include, for example, pairs of data values 414 representing different sentences (or other units of natural language). Each sentence pair may be labeled with a similarity score that measures how semantically similar the two sentences in the pair are. For example, the sentence pair "what measures are in place to protect your data?/how do you safeguard information?" might be assigned a relatively high similarity score because they are asking essentially the same question. On the other hand, the sentence pair "how many data breaches did you have last quarter?/how far away is your headquarters from the nearest fire department?" might receive a relatively low similarity score because they are unrelated.

Different types of training data 408 may be used for different purposes. For instance, labeled sentence pairs may be used to train an embedding model (such as an S-Bert model). On the other hand, the indexing model might make use of clustering to match a new query to an existing record set—the indexing model might therefore make use of AI classifiers that accept an input sentence and a label identifying the assigned category 416 that the sentence belongs to. Furthermore, the ranking model might apply a neural network or other type of AI construct to predict the relative rankings of two or more pieces of information.

The training data 408 may be collocated with the AI/ML system 402 (e.g., stored in a Storage 410 of the AI/ML system 402), may be remote from the AI/ML system 402 and accessed via a Network interface 404, or may be a combination of local and remote data. Each unit of training data 408 may be labeled with an assigned category 416 (or multiple assigned categories); for instance, each row and/or column may be labeled with a classification. In some embodiments, the training data may include individual data elements (e.g., not organized into rows or columns) and may be labeled on an individual basis.

As noted above, the AI/ML system 402 may include a Storage 410, which may include a hard drive, solid state storage, and/or random access memory.

The Training data 412 may be applied to train a model 422. Depending on the particular application, different types of models 422 may be suitable for use. For instance, exemplary embodiments described above make use of an embedding model (e.g., an S-Bert model), an indexing model (e.g., a FAISS index), and a ranking model (e.g., a neural network, set of rules, etc.). Other types of models 422, or non-model-based systems, may also be well-suited to the tasks described herein, depending on the designer's goals, the resources available, the amount of input data available, etc.

Any suitable Training algorithm 418 may be used to train the model 422. Nonetheless, the example depicted in FIG. 4 may be particularly well-suited to a supervised training algorithm. For a supervised training algorithm, the AI/ML system 402 may apply the data values 414 as input data, to which the resulting assigned category 416 may be mapped to learn associations between the inputs and the labels. In this case, the assigned category 416 may be used as a labels for the data values 414.

The Training algorithm 418 may be applied using a Processor circuit 406, which may include suitable hardware processing resources that operate on the logic and structures in the Storage 410. The Training algorithm 418 and/or the development of the trained model 422 may be at least partially dependent on model Hyperparameters 420; in exemplary embodiments, the model Hyperparameters 420 may be automatically selected based on Hyperparameter optimization logic 428, which may include any known hyperparameter optimization techniques as appropriate to the model 422 selected and the Training algorithm 418 to be used. Optionally, the model 422 may be re-trained over time.

In some embodiments, some of the Training data 412 may be used to initially train the model 422, and some may be held back as a validation subset. The portion of the Training data 412 not including the validation subset may be used to train the model 422, whereas the validation subset may be held back and used to test the trained model 422 to verify that the model 422 is able to generalize its predictions to new data.

Once the model 422 is trained, it may be applied (by the Processor circuit 406) to new input data. The new input data may include unlabeled data stored in a data structure, potentially organized into rows and/or columns. This input to the model 422 may be formatted according to a predefined input structure 424 mirroring the way that the Training data 412 was provided to the model 422. The model 422 may generate an output structure 426 which may be, for example, a prediction of an assigned category 416 to be applied to the unlabeled input.

The above description pertains to a particular kind of AI/ML system 402, which applies supervised learning techniques given available training data with input/result pairs. However, the present invention is not limited to use with a specific AI/ML paradigm, and other types of AI/ML techniques may be used.

Figure 5:
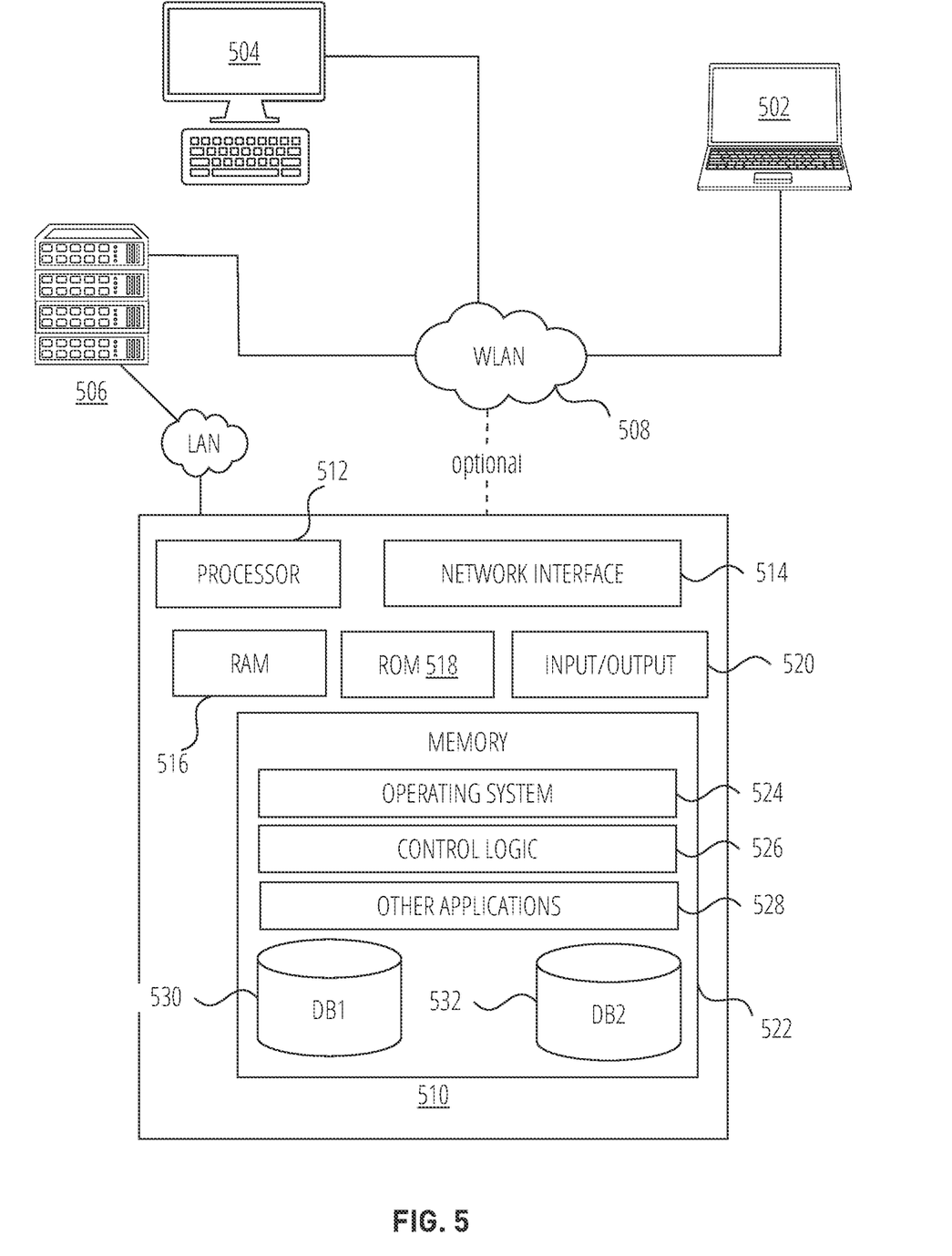
FIG. 5 depicts an illustrative computer system architecture that may be used to practice exemplary embodiments described herein.

FIG. 5 illustrates one example of a system architecture and data processing device that may be used to implement one or more illustrative aspects described herein in a standalone and/or networked environment. Various network nodes, such as the data server 510, web server 506, computer 504, and laptop 502 may be interconnected via a wide area network 508 (WAN), such as the internet. Other networks may also or alternatively be used, including private intranets, corporate networks, LANs, metropolitan area networks (MANs) wireless networks, personal networks (PANs), and the like. Network 508 is for illustration purposes and may be replaced with fewer or additional computer networks. A local area network (LAN) may have one or more of any known LAN topology and may use one or more of a variety of different protocols, such as ethernet. Devices data server 510, web server 506, computer 504, laptop 502 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 510, web server 506, and client computer 504, laptop 502. Data server 510 provides overall access, control and administration of databases and control software for performing one or more illustrative aspects described herein. Data server 510 may be connected to web server 506 through which users interact with and obtain data as requested. Alternatively, data server 510 may act as a web server itself and be directly connected to the internet. Data server 510 may be connected to web server 506 through the network 508 (e.g., the internet), via direct or indirect connection, or via some other network.

Users may interact with the data server 510 using remote computer 504, laptop 502, e.g., using a web browser to connect to the data server 510 via one or more externally exposed web sites hosted by web server 506. Client computer 504, laptop 502 may be used in concert with data server 510 to access data stored therein, or may be used for other purposes. For example, from client computer 504, a user may access web server 506 using an internet browser, as is known in the art, or by executing a software application that communicates with web server 506 and/or data server 510 over a computer network (such as the internet).

Servers and applications may be combined on the same physical machines, and retain separate virtual or logical addresses, or may reside on separate physical machines. FIG. 5 illustrates just one example of a network architecture that may be used, and those of skill in the art will appreciate that the specific network architecture and data processing devices used may vary, and are secondary to the functionality that they provide, as further described herein. For example, services provided by web server 506 and data server 510 may be combined on a single server.

Each component data server 510, web server 506, computer 504, laptop 502 may be any type of known computer, server, or data processing device. Data server 510, e.g., may include a processor 512 controlling overall operation of the data server 510. Data server 510 may further include RAM 516, ROM 518, network interface 514, input/output interfaces 520 (e.g., keyboard, mouse, display, printer, etc.), and memory 522. Input/output interfaces 520 may include a variety of interface units and drives for reading, writing, displaying, and/or printing data or files. Memory 522 may further store operating system software 524 for controlling overall operation of the data server 510, control logic 526 for instructing data server 510 to perform aspects described herein, and other application software 528 providing secondary, support, and/or other functionality which may or may not be used in conjunction with aspects described herein. The control logic may also be referred to herein as the data server software control logic 526. Functionality of the data server software may refer to operations or decisions made automatically based on rules coded into the control logic, made manually by a user providing input into the system, and/or a combination of automatic processing based on user input (e.g., queries, data updates, etc.).

Memory 1122 may also store data used in performance of one or more aspects described herein, including a first database 532 and a second database 530. In some embodiments, the first database may include the second database (e.g., as a separate table, report, etc.). That is, the information can be stored in a single database, or separated into different logical, virtual, or physical databases, depending on system design. Web server 506, computer 504, laptop 502 may have similar or different architecture as described with respect to data server 510. Those of skill in the art will appreciate that the functionality of data server 510 (or web server 506, computer 504, laptop 502) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising, via at least one computing device comprising at least one processor and a memory storing instructions that, when executed by the at least one processor, cause the computing device to perform the computer-implemented method via:

receiving a natural language search query pertaining to a request for information;

accessing a set of documents, each document of the set of documents comprising a document query and a document response, each document query embedded in an embedding space according to an embedding model, wherein the set of documents are clustered into a plurality of cells based on the document query;

creating a search query embedding of the search query using the embedding model;

assigning the search query embedding to a cell of the plurality of cells;

using the search query embedding to perform a semantic search on the embedding space of documents clustered in the cell; and returning at least one returned document of the set of documents as a search result based on a proximity of the document query from the at least one returned document to the search query in the embedding space, wherein the returned document along with metadata associated with the returned document includes an identifier for an individual that generated or approved the returned document is displayed in a graphical user interface (GUI).

2. The computer-implemented method of claim 1, wherein the request for information is from a regulatory entity, and the set of documents comprises previous responses to at least one previous query from the regulatory entity; and wherein the natural language search query is also displayed on the GUI.

3. The computer-implemented method of claim 1, wherein the at least one returned document comprises a plurality of returned documents, each of the plurality of returned documents being ranked based on the proximity; and wherein the GUI is configured to display the plurality of returned documents in a ranked order based on the proximity, the method further comprising:

submitting the document query from each of the plurality of returned documents to a reranking model configured to rerank the plurality of returned documents based on user feedback provided in the GUI; and reranking the plurality of returned documents based on the reranking model.

4. The computer-implemented method of claim 3, further comprising:

receiving the user feedback for a selected search result; and retraining the reranking model based on the user feedback.

5. The computer-implemented method of claim 1, further comprising:
   training the embedding model with a set of labeled data; and
   training an indexing model configured to perform the semantic search on the embedding space.

6. The computer-implemented method of claim 5, wherein the set of documents is a first set of documents and the semantic search is a first semantic
   swapping the first set of documents for a second set of documents different from the first set of documents; and
   applying the indexing model to perform a second semantic search based on a new natural language search query.

7. The computer-implemented method of claim 1, wherein the proximity of the document query from the returned document to the search query in the embedding space is represented as a cosine similarity.

8. A non-transitory computer-readable storage medium, the computer-readable storage medium storing instructions that,-when executed by a computer, cause the computer to:
   receive a natural language search query pertaining to a request for information;
   access a set of documents, each document of the set of documents comprising a document query and a document response, each document query embedded in an embedding space according to an embedding model, wherein the set of documents are clustered into a plurality of cells based on the document query;
   create a search query embedding of the search query using the embedding model;
   assign the search query embedding to a cell of the plurality of cells;
   use the search query embedding to perform a semantic search on the embedding space of documents clustered in the cell; and
   return at least one returned document of the set of documents as a search result based on a proximity of the document query from the at least one returned document to the search query in the embedding space, wherein the returned document along with metadata associated with the returned document includes an identifier for an individual that generated or approved the returned document is displayed in a graphical user interface (GUI).

9. The computer-readable storage medium of claim 8, wherein the request for information is from a regulatory entity, and the set of documents comprises previous responses to at least one previous query from the regulatory entity; and
   wherein the natural language search query is also displayed on the GUI.

10. The computer-readable storage medium of claim 8, wherein the at least one returned document comprises a plurality of returned documents, each of the plurality of returned documents being ranked based on the proximity;
    wherein the GUI is configured to display the plurality of returned documents in a ranked order based on the proximity; and
    wherein the instructions further configure the computer to:
    submit the document query from each of the plurality of returned documents to a reranking model configured to rerank the plurality of returned documents based on user feedback provided on the GUI; and
    rerank the plurality of returned documents based on the reranking model.

11. The computer-readable storage medium of claim 10, wherein the instructions further configure the computer to:
    receive the user feedback for a selected search result; and
    retrain the reranking model based on the user feedback.

12. The computer-readable storage medium of claim 8, wherein the instructions further configure the computer to:
    train the embedding model with a set of labeled data; and
    train an indexing model configured to perform the semantic search on the embedding space.

13. The computer-readable storage medium of claim 12, wherein the set of documents is a first set of documents and the semantic search is a first semantic search, and wherein the instructions further configure the computer to:
    swap the first set of documents for a second set of documents different from the first set of documents; and
    apply the indexing model to perform a second semantic search based on a new natural language search query.

14. The computer-readable storage medium of claim 8, wherein the proximity of the document query from the returned document to the search query in the embedding space is represented as a cosine similarity.

15. A computing apparatus comprising:
    a processor; and
    a memory storing instructions that, when executed by the processor, cause the apparatus to:
    receive a natural language search query pertaining to a request for information;
    access a set of documents, each document of the set of documents comprising a document query and a document response, each document query embedded in an embedding space according to an embedding model, wherein the set of documents are clustered into a plurality of cells based on the document query;
    create a search query embedding of the search query using the embedding model;
    assign the search query embedding to a cell of the plurality of cells;
    use the search query embedding to perform a semantic search on the embedding space of documents clustered in the cell; and
    return at least one returned document of the set of documents as a search result based on a proximity of the document query from the at least one returned document to the search query in the embedding space, wherein the returned document along with metadata associated the returned document includes an identifier for an individual that generated or approved the returned document is displayed in a graphical user interface (GUI).

16. The computing apparatus of claim 15, wherein the request for information is from a regulatory entity, and the set of documents comprises previous responses to at least one previous query from the regulatory entity; and
    wherein the natural language search query is also displayed on the GUI.

17. The computing apparatus of claim 15, wherein the at least one returned document comprises a plurality of returned documents, each of the plurality of returned documents being ranked based on the proximity;
    wherein the GUI is configured to display the plurality of returned documents in a ranked order based on the proximity; and wherein the instructions further configure the apparatus to:
submit the document query from each of the plurality of returned documents to a reranking model configured to rerank the plurality of returned documents based on user feedback provided on the GUI; and
rerank the plurality of returned documents based on the reranking model.

18. The computing apparatus of claim 17, wherein the instructions further configure the apparatus to:
receive the user feedback for a selected search result; and
retrain the reranking model based on the user feedback.

19. The computing apparatus of claim 15, wherein the instructions further configure the apparatus to:
train the embedding model with a set of labeled data; and
train an indexing model configured to perform the semantic search on the embedding space.

20. The computing apparatus of claim 19, wherein the set of documents is a first set of documents and the semantic search is a first semantic search, and wherein the instructions further configure the apparatus to:
swap the first set of documents for a second set of documents different from the first set of documents; and
apply the indexing model to perform a second semantic search based on a new natural language search query.

* * * * *